US009141672B1

(12) United States Patent
Popovici et al.

(10) Patent No.: US 9,141,672 B1
(45) Date of Patent: Sep. 22, 2015

(54) CLICK OR SKIP EVALUATION OF QUERY TERM OPTIONALIZATION RULE

(71) Applicant: Google Inc., Mountain View, CA (US)

(72) Inventors: Dan Popovici, Cupertino, CA (US); Jeremy D. Hoffman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/727,968

(22) Filed: Dec. 27, 2012

Related U.S. Application Data

(60) Provisional application No. 61/590,399, filed on Jan. 25, 2012.

(51) Int. Cl.
*G06F 7/00* (2006.01)
*G06F 17/30* (2006.01)

(52) U.S. Cl.
CPC ........ *G06F 17/3053* (2013.01); *G06F 17/3097* (2013.01); *G06F 17/30867* (2013.01); *G06F 17/30967* (2013.01)

(58) Field of Classification Search
None
See application file for complete search history.

(56) References Cited

U.S. PATENT DOCUMENTS

| | | | |
|---|---|---|---|
| 4,164,025 A | 8/1979 | Dubnowski et al. | |
| 4,823,306 A | 4/1989 | Barbic et al. | |
| 5,724,571 A | 3/1998 | Woods | |
| 5,826,261 A | 10/1998 | Spencer | |
| 5,926,812 A | 7/1999 | Hilsenrath et al. | |
| 5,960,383 A | 9/1999 | Fleischer | |
| 5,987,457 A | 11/1999 | Ballard | |
| 6,006,222 A | 12/1999 | Culliss | |
| 6,012,053 A | 1/2000 | Pant et al. | |
| 6,014,665 A | 1/2000 | Culliss | |
| 6,029,195 A | 2/2000 | Herz | |
| 6,035,294 A | 3/2000 | Fish | |
| 6,078,916 A | 6/2000 | Culliss | |
| 6,169,986 B1 | 1/2001 | Bowman et al. | |
| 6,182,067 B1 | 1/2001 | Presnell et al. | |

(Continued)

FOREIGN PATENT DOCUMENTS

| EP | 1505520 | 5/2006 |
|---|---|---|
| WO | 2006096842 | 9/2006 |

OTHER PUBLICATIONS

Huang et al., "Analyzing and Evaluating Query Reformulation Strategies in Web Search Logs", CIKM '09, pp. 77-86. 2009, ACM.*

(Continued)

*Primary Examiner* — Michael Hicks
(74) *Attorney, Agent, or Firm* — Fish & Richardson P.C.

(57) ABSTRACT

Methods, systems, and apparatus, including computer programs encoded on a computer storage medium, for click or skip evaluation of optionalization rules. In one aspect, a method includes accessing query log data that identifies, for an initial search query, one or more revised search queries that were identified by designating a query term of the initial search query as optional according to one or more optionalization rules, and a particular search result selected by the user. A determination is made, using the query log data, that the particular search result corresponds to the one or more revised search queries that were identified by designating the query term of the initial search query as optional according to one or more optionalization rules. In response to this determination, a click count is incremented for the one or more optionalization rules that corresponds to the particular search result.

32 Claims, 6 Drawing Sheets

(56) References Cited

U.S. PATENT DOCUMENTS

| | | |
|---|---|---|
| 6,272,507 B1 | 8/2001 | Pirolli et al. |
| 6,285,999 B1 | 9/2001 | Page |
| 6,289,353 B1 | 9/2001 | Hazlehurst et al. |
| 6,311,214 B1 | 10/2001 | Rhoads |
| 6,314,419 B1 | 11/2001 | Faisal |
| 6,360,215 B1 | 3/2002 | Judd et al. |
| 6,405,175 B1 | 6/2002 | Ng |
| 6,421,675 B1 | 7/2002 | Ryan et al. |
| 6,473,752 B1 | 10/2002 | Fleming |
| 6,480,837 B1 | 11/2002 | Dutta |
| 6,513,036 B2 | 1/2003 | Fruensgaard et al. |
| 6,636,848 B1 | 10/2003 | Aridor et al. |
| 6,732,088 B1 | 5/2004 | Glance |
| 6,772,150 B1 | 8/2004 | Whitman et al. |
| 7,062,561 B1 | 6/2006 | Reisman |
| 7,085,820 B1 | 8/2006 | Nickerson et al. |
| 7,409,383 B1 | 8/2008 | Tong et al. |
| 7,480,652 B2 | 1/2009 | Wen et al. |
| 7,562,069 B1 | 7/2009 | Chowdhury et al. |
| 7,565,345 B2 * | 7/2009 | Bailey et al. ............... 1/1 |
| 7,617,200 B2 | 11/2009 | Budzik et al. |
| 7,617,205 B2 * | 11/2009 | Bailey et al. ............... 1/1 |
| 7,620,628 B2 | 11/2009 | Kapur et al. |
| 7,636,714 B1 | 12/2009 | Lamping et al. |
| 7,716,216 B1 | 5/2010 | Harik et al. |
| 7,788,261 B2 | 8/2010 | Hoeber et al. |
| 7,860,870 B2 | 12/2010 | Sadagopan et al. |
| 7,925,498 B1 | 4/2011 | Baker et al. |
| 7,966,341 B2 | 6/2011 | Maghoul et al. |
| 8,001,118 B2 | 8/2011 | Dean et al. |
| 8,037,086 B1 | 10/2011 | Upstill et al. |
| 8,041,730 B1 | 10/2011 | Upstill et al. |
| 8,065,316 B1 | 11/2011 | Baker et al. |
| 8,103,669 B2 | 1/2012 | Castellani et al. |
| 8,250,066 B2 | 8/2012 | Miedema |
| 8,316,007 B2 | 11/2012 | Liao |
| 8,321,201 B1 | 11/2012 | Baker et al. |
| 8,346,757 B1 | 1/2013 | Lamping et al. |
| 8,352,469 B2 | 1/2013 | Rose |
| 8,392,443 B1 | 3/2013 | Allon et al. |
| 8,401,841 B2 | 3/2013 | Roitblat et al. |
| 8,429,184 B2 * | 4/2013 | Ismalon ............... 707/765 |
| 8,463,782 B1 | 6/2013 | Upstill et al. |
| 8,498,974 B1 | 7/2013 | Kim et al. |
| 8,504,562 B1 | 8/2013 | Ikeda et al. |
| 8,538,984 B1 | 9/2013 | Mahabal et al. |
| 8,600,973 B1 * | 12/2013 | Popovici et al. ............... 707/708 |
| 8,620,915 B1 | 12/2013 | Brukman et al. |
| 8,631,019 B1 | 1/2014 | Shaw et al. |
| 8,645,390 B1 | 2/2014 | Oztekin et al. |
| 8,762,363 B1 | 6/2014 | Koo et al. |
| 2002/0032735 A1 | 3/2002 | Burnstein et al. |
| 2002/0078045 A1 | 6/2002 | Dutta |
| 2002/0103798 A1 | 8/2002 | Abrol et al. |
| 2002/0133483 A1 | 9/2002 | Klenk et al. |
| 2002/0156816 A1 | 10/2002 | Kantrowitz et al. |
| 2003/0123443 A1 | 7/2003 | Anwar |
| 2003/0167266 A1 | 9/2003 | Saldanha et al. |
| 2004/0236730 A1 | 11/2004 | Frank |
| 2005/0076003 A1 | 4/2005 | DuBose et al. |
| 2005/0125392 A1 | 6/2005 | Curtis et al. |
| 2006/0167842 A1 | 7/2006 | Watson |
| 2006/0253427 A1 | 11/2006 | Wu et al. |
| 2007/0005590 A1 | 1/2007 | Thrasher |
| 2007/0011154 A1 | 1/2007 | Musgrove et al. |
| 2007/0094234 A1 | 4/2007 | Wen et al. |
| 2007/0214131 A1 | 9/2007 | Cucerzan et al. |
| 2008/0040325 A1 | 2/2008 | Sachs et al. |
| 2008/0091670 A1 | 4/2008 | Ismalon |
| 2008/0097891 A1 | 4/2008 | Park |
| 2008/0114721 A1 | 5/2008 | Jones et al. |
| 2008/0114751 A1 | 5/2008 | Cramer et al. |
| 2008/0140641 A1 | 6/2008 | Wang |
| 2008/0140643 A1 | 6/2008 | Ismalon |
| 2008/0147638 A1 | 6/2008 | Hoeber et al. |
| 2008/0228754 A1 | 9/2008 | Frank et al. |
| 2008/0235187 A1 | 9/2008 | Gade et al. |
| 2008/0270138 A1 | 10/2008 | Knight et al. |
| 2009/0006359 A1 | 1/2009 | Liao |
| 2009/0043749 A1 | 2/2009 | Garg et al. |
| 2009/0063431 A1 | 3/2009 | Erol et al. |
| 2009/0106221 A1 | 4/2009 | Meyerzon et al. |
| 2009/0119261 A1 | 5/2009 | Ismalon |
| 2009/0182734 A1 | 7/2009 | Wen et al. |
| 2009/0198672 A1 | 8/2009 | Jones et al. |
| 2009/0313286 A1 | 12/2009 | Mishra et al. |
| 2010/0010968 A1 | 1/2010 | Redlich et al. |
| 2010/0125575 A1 | 5/2010 | Zaragoza |
| 2010/0138402 A1 | 6/2010 | Burroughs et al. |
| 2010/0257164 A1 | 10/2010 | Halverson et al. |
| 2010/0306229 A1 | 12/2010 | Timm et al. |
| 2011/0078049 A1 | 3/2011 | Rehman et al. |
| 2011/0179023 A1 | 7/2011 | Dean et al. |
| 2011/0258149 A1 | 10/2011 | Kanungo et al. |
| 2012/0095951 A1 | 4/2012 | Ray |
| 2012/0158685 A1 | 6/2012 | White et al. |
| 2012/0158765 A1 | 6/2012 | Kumar et al. |
| 2012/0290637 A1 | 11/2012 | Perantatos et al. |
| 2012/0303651 A1 * | 11/2012 | Tao ............... 707/768 |
| 2012/0317088 A1 | 12/2012 | Pantel et al. |
| 2012/0323677 A1 | 12/2012 | Bottou et al. |
| 2013/0041921 A1 | 2/2013 | Cooper et al. |
| 2013/0086509 A1 | 4/2013 | Satyanarayana et al. |
| 2013/0246383 A1 | 9/2013 | White et al. |

OTHER PUBLICATIONS

Efthimiadis, "Interactive Query Expansion: A User-Based Evaluation in a Relevance Feedback Environment", Journal of the American Society for Information Science, 51(aa), pp. 989-1003, 2000, John Wiley & Sons, Inc.*

Yin et al., "The Query Expansion Method Based on Semantic Skeleton", International Workshop on Intelligent Systems and Applications, pp. 1-4, 2009, IEEE.*

"The Direct Hit Popularity Engine Technology, A White Paper," [online]; Retrieved from the Internet URL: http://www.uni-koblenz.de/FB4/Institues/ICV/AGKrause/Teachings/SS07/DirectHit.pdf, Apr. 2, 2009, 5 pages.

Ananthanarayanan et al., "Rule based synonyms for entity extraction from noisy text", In Proceedings of the second workshop on Analytics for noisy unstructured text data, pp. 31-38, ACM, Jul. 2008.

Office Action issued in U.S. Appl. No. 13/661,734 on Apr. 14, 2014, 7 pages.

Notice of Allowance issued in U.S. Appl. No. 13/532,326 on Feb. 25, 2014, 5 pages.

Office Action issued in U.S. Appl. No. 13/532,326 on Oct. 24, 2013, 14 pages.

Office Action issued in U.S. Appl. No. 13/481,166 on Jun. 19, 2014, 8 pages.

Office Action issued in U.S. Appl. No. 13/651,688 on Apr. 7, 2014, 33 pages.

Office Action issued in U.S. Appl. No. 13/651,688 on Jan. 17, 2014, 31 pages.

Office Action issued in U.S. Appl. No. 13/443,405 on Jun. 19, 2014, 10 pages.

Office Action issued in U.S. Appl. No. 13/302,935 on Jul. 11, 2014, 16 pages.

Notice of Allowance received in U.S. Appl. No. 13/342,560 on Jul. 24, 2013, 23 pages.

Office Action issued in U.S. Appl. No. 13/342,560 on Apr. 18, 2013, 14 pages.

Office Action issued in U.S. Appl. No. 13/342,560 on Nov. 26, 2012, 16 pages.

Office Action issued in U.S. Appl. No. 13/342,604 on Dec. 20, 2012, 13 pages.

Office Action issued in U.S. Appl. No. 13/342,604 on May 13, 2013, 12 pages.

(56) References Cited

OTHER PUBLICATIONS

Office Action issued in U.S. Appl. No. 13/564,882 on Jul. 1, 2014, 8 pages.
Huang et al., "Analyzing and Evaluating Query Reformulation Strategies in Web Search Logs," CIKM'09, Nov. 2-6, 2009, 77-86, 10 pages.
Office Action issued in U.S. Appl. No. 13/342,604 on Jan. 29, 2015, 32 pages.
Office Action issued in U.S. Appl. No. 13/735,541 on Feb. 12, 2015, 27 pages.
Office Action issued in U.S. Appl. No. 13/651,688 on Mar. 25, 2015, 52 pages.

\* cited by examiner

CLICK OR SKIP EVALUATION OF QUERY TERM OPTIONALIZATION RULE

CROSS-REFERENCE TO RELATED APPLICATION

This application claims the benefit of U.S. Patent Application No. 61/590,399 filed Jan. 25, 2012, the contents of which are incorporated herein by reference.

BACKGROUND

This specification generally relates to search engines, and one particular implementation relates to evaluating optionalization rules that are used in revising search queries.

SUMMARY

In general, one innovative aspect of the subject matter described in this specification may be embodied in methods that include the actions of evaluating a query term optionalization rule based on determining whether a user has (i) selected a search result that corresponds to a query term designated as optional according to the optionalization rule (referred to as a "click evaluation" of the optionalization rule), or (ii) selected a search result that ranks below a search result that corresponds to a query term designated as optional according to the optionalization rule (referred to as a "skip evaluation" of the optionalization rule). In either instance, the optionalizing engine may infer, through a user's clicking on or skipping a particular search result, that the query term's designation as optional played some part in the user's decision to select or not select the particular search result. This insight may be used to measure the quality of the optionalization rule.

In general, another innovative aspect of the subject matter described in this specification may be embodied in methods that include the actions of accessing query log data that identifies, for an initial search query, a query term included in the initial search query, one or more revised search queries that were identified by designating the query term of the initial search query as optional according to a corresponding one or more query term optionalization rules, search results that were identified using the initial search query and the one or more revised search queries, and a particular search result selected by the user. A determination is made, using the query log data, that the particular search result corresponds to the one or more revised search queries that were identified by designating the query term of the initial search query as optional according to a corresponding one or more query term optionalization rules. In response to determining that the particular search result corresponds to the one or more revised search queries that were identified by designating the query term of the initial search query as optional according to a corresponding one or more query term optionalization rules, a click count is incremented for the one or more query term optionalization rules that corresponds to the particular search result. Other embodiments of this aspect include corresponding systems, apparatus, and computer programs recorded on computer storage devices, each configured to perform the operations of the methods.

These and other embodiments can each optionally include one or more of the following features. The actions include ranking the search results. The actions include determining, using query log data, that a search result that is ranked above the particular search result corresponds to the one or more revised search queries that were identified by designating the query term of the initial search query as optional according to a corresponding one or more query term optionalization rules. In response to determining that the search result that is ranked above the particular search result corresponds to the one or more revised search queries that were identified by designating the query term of the initial search query as optional according to a corresponding one or more query term optionalization rules, a skip count is incremented for the one or more query term optionalization rule that corresponds to the search result that is ranked above the particular search result. The actions include assigning a score to the one or more query term optionalization rules based on the click count and the skip count. The score is based on a ratio of (i) the click count to (ii) the click count and the skip count. The actions include determining that the score of the one or more query term optionalization rules does not meet a threshold, and removing the one or more query term optionalization rules from a set of query term optionalization rules used to generate revised search queries based on determining that the score does not meet the threshold. The actions include associating a first weight with the click count and a second weight with the skip count. The actions include determining, using the query log data, that the one or more revised search queries that were generated by designating the query term of the initial search query as optional according to a corresponding one or more query term optionalization rules with a particular context, and where incrementing a click count for the one or more optionalization rules comprises incrementing a click count for the one or more optionalization rules with the particular context. The score satisfies Equation (1), where, in Equation (1), W1 represents a weight associated with the click count and W2 represents a weight associated with the skip count:

$$\frac{W1(\text{click count})}{W1(\text{click count}) + W2(\text{skip count})} \quad (1)$$

In general, another innovative aspect of the subject matter described in this specification may be embodied in methods that include the actions of accessing query log data that identifies, for an initial search query, a query term included in the initial search query, one or more revised search queries that were identified by designating the query term of the initial search query as optional according to a corresponding one or more query term optionalization rules, search results that were identified using the initial search query and the one or more revised search queries, a ranking of the search results, and a particular search result selected by the user. A determination is made, using the query log data, that a search result that is ranked above the particular search result corresponds to the one or more revised search queries that were identified by designating the query term of the initial search query as optional according to a corresponding one or more query term optionalization rules. In response to determining that the search result that is ranked above the particular search result corresponds to the one or more revised search queries that were identified by designating the query term of the initial search query as optional according to a corresponding one or more query term optionalization rules, a skip count is incremented for the one or more query term optionalization rule that corresponds to the search result that is ranked above the particular search result. Other embodiments of this aspect include corresponding systems, apparatus, and computer programs recorded on computer storage devices, each configured to perform the operations of the methods.

These and other embodiments can each optionally include one or more of the following features. The actions include determining, using the query log data, that the particular search result corresponds to the one or more revised search queries that were identified by designating the query term of the initial search query as optional according to a corresponding one or more query term optionalization rules. In response to determining that the particular search result corresponds to the one or more revised search queries that were identified by designating the query term of the initial search query as optional according to a corresponding one or more query term optionalization rules, a click count is incremented for the one or more query term optionalization rules that corresponds to the particular search result. The actions include assigning a score to the one or more query term optionalization rules based on the click count and the skip count. The score is based on a ratio of (i) the click count to (ii) the click count and the skip count. The actions include determining that the score of the one or more query term optionalization rules does not meet a threshold, and removing the one or more query term optionalization rules from a set of query term optionalization rules used to generate revised search queries based on determining that the score does not meet the threshold. The actions include associating a first weight with the click count and a second weight with the skip count. The score satisfies Equation (1). The actions include determining, using the query log data, that the one or more revised search queries that were generated by designating the query term of the initial search query as optional according to a corresponding one or more query term optionalization rules with a particular context, and wherein incrementing a skip count for the one or more optionalization rules comprises incrementing a skip count for the one or more optionalization rules with the particular context.

Other embodiments of these aspects include corresponding systems, apparatus, and computer programs, configured to perform the actions of the methods, encoded on computer storage devices.

Particular embodiments of the subject matter described in this specification can be implemented so as to realize one or more of the following advantages. Click and skip evaluation of optionalization rules can identify optionalization rules that should be removed from a search system. Click and skip evaluation can also improve the quality of retrieved search results by helping to eliminate search results that users found unhelpful. Click and skip evaluation of optionalization rules can also demote (instead of removing completely) optionalization rules, allowing low-confidence rules to be used less frequently in retrieving search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
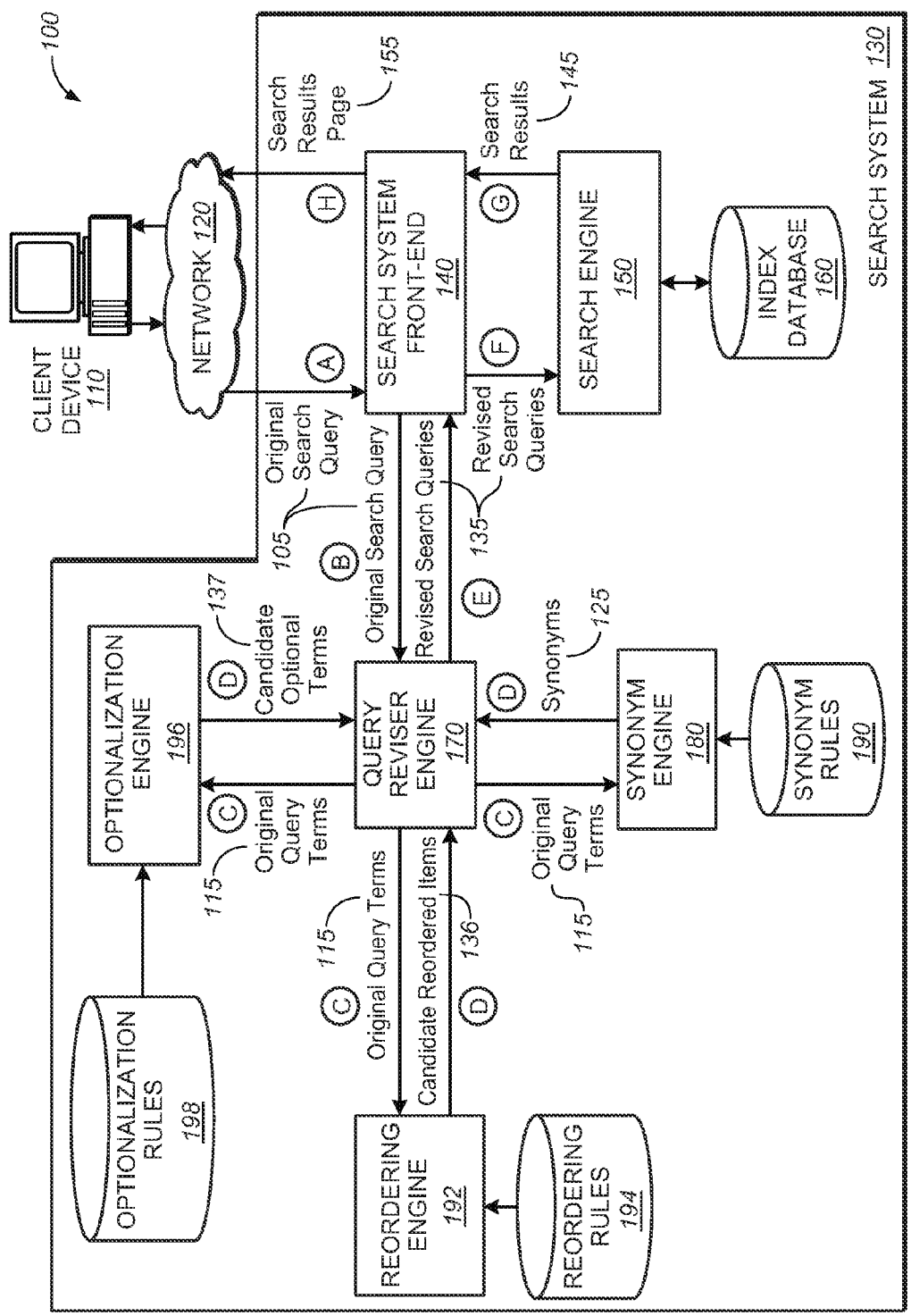
FIG. 1 is a diagram of an example system that revises search queries to include synonyms of query terms, to reorder query terms, and to optionalize query terms.

FIG. 1 is a diagram of an example system 100 that revises search queries, for instance to reorder query terms, to optionalize query terms, and to include synonyms of query terms. In general, the system 100 includes a client device 110 coupled to a search system 130 over a network 120. The search system 130 receives an original search query 105 from the client device 110 over network 120, and the search system 130 provides a search results page 155 that presents search results 145 identified as being responsive to the query 105 to the client device 110 over the network 120.

The search results 145 identified by the search system 130 can include one or more search results that were identified as being responsive to queries that are different than the original search query 105. The other queries can be obtained or generated in numerous ways, including by revising the original search query 105.

In one example, the search system 130 can generate a revised search query 135 by reordering the terms of the original search query 105. In other implementations, the search system 130 can generate a revised search query 135 by designating terms of the original search query 105 as optional. As used by this specification, "reorderings" are terms of the original search query 105 that have been reordered according to a reordering rule, and "optionalizations" are terms of the original search query 105 that have been designated as optional. The original search query 105 and the revised queries 135 can be used by a search engine 150 to identify and rank search results. The identified search results 145 can be provided to the client device 110 on a search results page 155.

The search system 130 can generate candidate reordered terms 136 from the original search query 105 by reordering some or all of the original query terms 115 according to various query term reordering rules. For instance, given the original query terms 115 "pants 34 30", the search system can generate candidate reordered terms "34 30 pants" and "pants 30 34", and can use some or all of the candidate reordered terms 136 when revising the original search query 105.

The search system 130 can identify candidate optional terms 137 from the original search query 105, by applying optionalization rules 198 to the original search query 105. For instance, given the original query "atlanta extreme bungee jump", the search system can identify some or all of the terms as candidate optional terms 137, and can designate some or all of the candidate optional terms 137 as optional when revising the original search query 105.

The search system 130 can be implemented as, for example, computer programs running on one or more computers in one or more locations that are coupled to each other through a network. The search system 130 includes a search system front end 140 (or a "gateway server") to coordinate requests between other parts of the search system 130 and the client device 110. The search system 130 also includes a search engine 150, a query reviser engine 170, a synonym engine 180, a reordering engine 192, and an optionalization engine 196.

As used by this specification, an "engine" (or "software engine") refers to a software implemented input/output system that provides an output that is different than the input. An engine may be an encoded block of functionality, such as a library, a platform, Software Development Kit ("SDK"), or an object. The network 120 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, search engine 150, query reviser engine 170, and synonym engine 180, reordering engine 192, and optionalization engine 196 can be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device 110 includes one or more processors, computer readable media that store software applications (e.g. a browser layout engine), an input module (e.g., a keyboard or mouse), communication interface, and a display. The computing device or devices that implement the search system front-end 140, the query reviser engine 170, and the search engine 150 may include similar or different components.

In general, the search system front-end 140 receives the original search query 105 from client device 110, and routes the original search query 105 to the appropriate engines so that the search engine results page 155 may be generated. In some implementations, routing occurs by referencing static routing tables, or routing may occur based on the current network load of an engine, so as to accomplish a load balancing function. The search system front-end 140 also provides the resulting search engine results page 155 to the client device 110. In doing so, the search system front-end 140 acts as a gateway, or interface, between the client device 110 and the search engine 150. In some implementations, the search system 130 contains many thousands of computing devices to execute for the queries that are processed by the search system 130.

Two or more of the search system front-end 140, the query reviser engine 170, and the search engine 150 may be implemented on the same computing device, or on different computing devices. Because the search engine results page 155 is generated based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted search query 105.

In FIG. 1, a user of the client device 110 enters query terms 115 for the original search query 105 during state (A), and the client device 110 communicates the original search query 105 to the search system 130 over the network 120. The user may submit the original search query 105 by initiating a search dialogue on the client device 110, by speaking or typing the terms 115 of the original search query 110, then by pressing a search initiation button or control on the client device 110. The client device 110 formulates the original search query 105, e.g., by specifying search parameters, and transmits the original search query 105 over the network 120.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 may be the second or subsequent query entered by the user, or the original query 105 may be automatically derived (e.g., by the query reviser engine 170) or may be modified based upon prior queries entered by the user, location information, and the like.

During state (B), the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query 135 by reordering terms in the original search query 105. The query reviser engine 170 can obtain candidate reordered terms 136 for use in revising the original search query 105 from reordering engine 192. In other implementations, the query reviser engine 170 generates a revised search query 135 by designating terms in the original search query 105 as optional. The query reviser engine 170 can obtain candidate optional terms 137 for use in revising the original search query 105 from optionalization engine 196. In other implementations, the query reviser engine 170 can generate one or more revised queries 135 using any combination of terms generated by the synonym engine 180, the reordering engine 192, and the optionalization engine 196.

During state (C), the query reviser engine 170 communicates original query terms 115 of the original search query 105 to the synonym engine 180, the reordering engine 192, and the optionalization engine 196. The synonym engine 180 uses synonym rules 190 to generate synonyms 125 for the original query terms 115 of the original search query 105. The reordering engine 192 uses reordering rules 194 to generate candidate reordered terms 136 for the original query terms 115 of the original search query 105. The optionalization engine 196 uses optionalization rules 198 to generate candidate optional terms 137 for the original query terms 115 of the original search query 105.

The search system 130 can define a reordering rule for a search query, and can use the reordering rule at a later time to identify candidate reordered terms 136 for search queries. For example, for the search query "pants 34 30," the search system 130 can identify a reordering rule that indicates that "34 30 pants" are candidate reordered terms 136, and can generate a revised search query to include the candidate reordered terms 136.

The search system 130 can define an optionalization rule for a search query, and can use the optionalization rule at a later time to identify candidate optional terms 137 for search queries. For example, for the search query "atlanta extreme bungee jump," the search system 130 can identify an optionalization rule that indicates "atlanta bungee jump; extreme (optional)" is an revised search query generated using the optionalization rule, and can generate a revised search query using "atlanta bungee jump; extreme (optional)."

Reordering rules can be defined to apply generally, or can be defined to apply only when particular query contexts are satisfied. The query context of a reordering rule can specify, for example, one or more other terms that must be present in the search query for the reordering rule to apply. Furthermore, query contexts can specify relative locations for the other terms (e.g. to the right or left of a query term under evaluation) or can specify a general location (e.g. anywhere in the search query). For example, a particular reordering rule can specify that numbers less than 100 should be swapped, but only when numbers less than 100 are not preceded by "pants" in the search query.

Optionalization rules can be defined to apply generally, or can be defined to apply only when particular query contexts are satisfied. The query context of an optionalization rule can specify, for example, one or more other terms that must be present in the search query for the optionalization rule to apply. Furthermore, query contexts can specify relative locations for the other terms (e.g. to the right or left of a query term under evaluation) or can specify a general location (e.g. anywhere in the search query). For example, a particular optionalization rule can specify that "extreme" should be optionalized, but only when in the context of "bungee jump."

The reordering rules can depend on query contexts that define other terms in the original query 105. In other words, a reordering rule need not apply in all situations. For example, when "555-123-4567" is used as a single-term query, the rule "swap numbers less that 1000" can apply and "123-555-4567" can be returned to the query reviser engine 170 to generate a revised search query. But when the query includes "555-123-4567" followed by "phone number," a reordering rule might not specify to swap numbers less than 1000. The reordering rules can be stored for use by, e.g., the reordering engine 192, the query reviser engine, 170, or the search engine 150.

The optionalization rules can depend of query contexts that define other terms in the original query 105. In other words, an optionalization rule need not apply in all situations. For example, when "to" is used as a single-term query, the rule "optionalize to" can apply and "to (optional)" can be returned to the query reviser engine 170 to generate a revised search query. But when the query includes "to" between "New York" and "Los Angeles," an optionalization rule might specify not to optionalize "to" when between two city names. The optionalization rules can be stored for use by, e.g., the reordering engine 192, the query reviser engine, 170, or the search engine 150.

The reordering engine 192 communicates candidate reordered terms 136 to the query reviser engine 170 during state (D). The query reviser engine 170 generates one or more revised queries 135 by, for example, including the candidate reordered terms 136 in a revised search query 135.

The optionalization engine 196 communicates candidate optional terms 137 to the query reviser engine 170 during state (D). The query reviser engine 170 generates one or more revised queries 135 by, for example, including the candidate optional terms 137 in a revised search query 135.

The query reviser engine 170 communicates the one or more revised queries 135 to the search system front-end 140 during state (E). The search system front-end 140 communicates the original search query 105 and/or the one or more revised queries 135 generated by the reordering rule to the search engine 150 during state (F). The search engine 150 generates search results 145 that it identifies as being responsive to the original search query 105 and/or the one or more revised queries 135 generated by the reordering rule. The search engine 150 can identify search results 145 for each search query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. Each of the search results 145 can include, for example, titles, text snippets, images, links, reviews, or other information. The query terms 115, the candidate reordered terms 136, or the candidate optional terms 137, that appear in the search results 145 can be formatted in a particular way, for example, in bold print. The search system front-end 140 transmits code (e.g., HyperText Markup Language code or eXtensible Markup Language code) for the search results page 155 to the client device 110 over the network 120 at state (H), so that the client device 110 can display the search results page 155.

The client device 110 invokes the transmitted code, e.g., using a layout engine, and displays the search results page 155 on the display 118. The terms 115 of the original query 105 are displayed in a query box (or "search box"), located for example, on the top of the search results page 155, and some of the search results 145 are displayed in a search results block, for example, on the left-hand side of the search results page 155.

Figure 2:
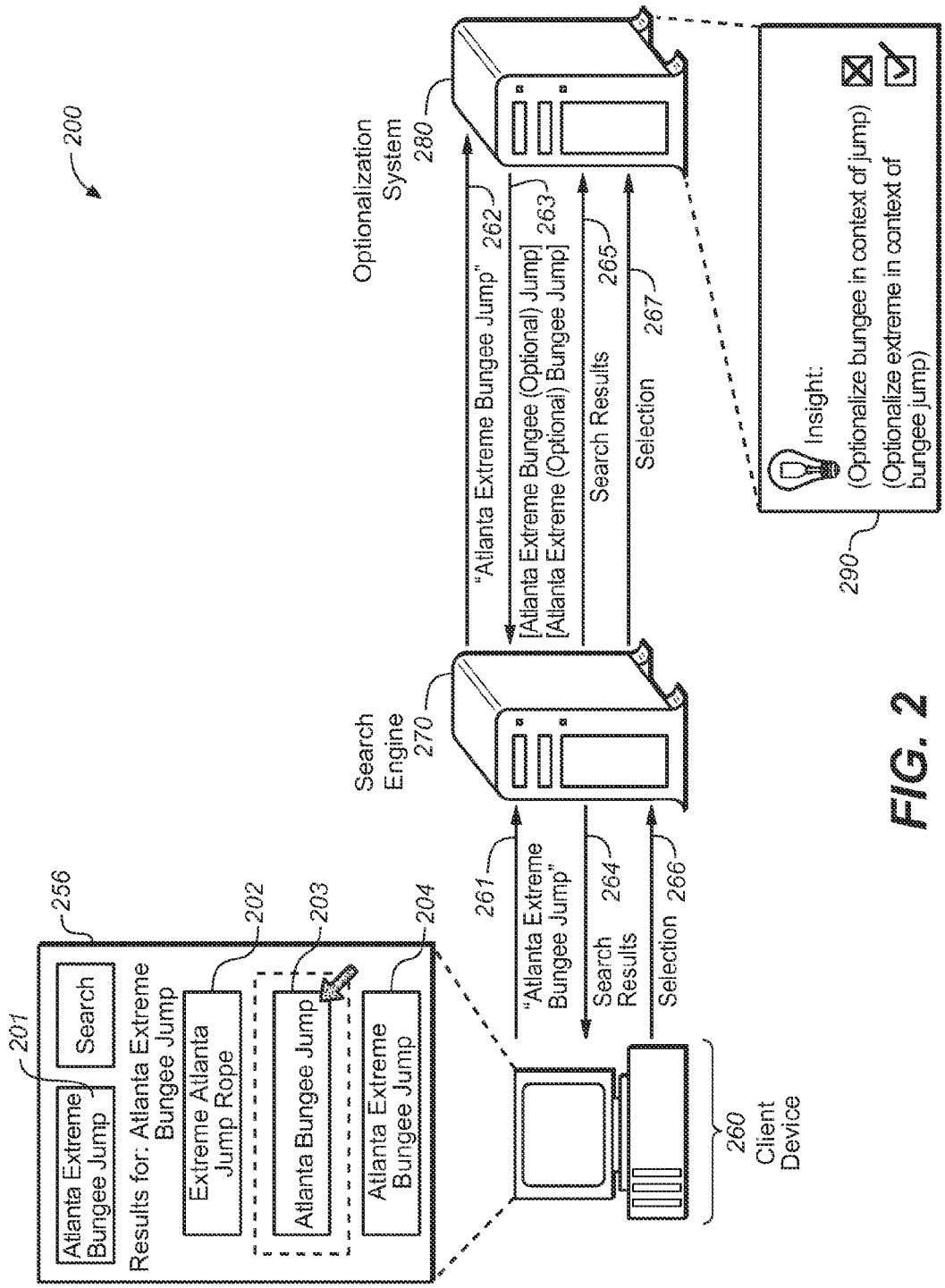
FIG. 2 is a diagram of an example system that evaluates optionalization rules.

FIG. 2 is a diagram of an example system 200 that evaluates reordering rules and optionalization rules. The system 200 includes a client device 260, a search engine system 270, and a reordering and optionalization system 280. The entities illustrated in FIG. 2 can, for example, be implemented as part of the system illustrated in FIG. 1. In general, the search engine system 270 receives queries 261 from the client device 260 and provides identified search results 264 on a generated search results page 256 in response to the received queries 261. The search results page 256 can also present the entered query 201.

Some of the provided search results 264 can be identified by the search engine system 270 by revising the received query to include candidate optional terms or candidate reordered terms for terms of the query 261. The search engine system 270 can provide a query message 262 that includes terms of the received query 261 to the optionalization system 280. The optionalization system 280 can identify candidate optional terms 263 for the terms of the received query 261 and provide the identified candidate optional terms 263 to the search engine system 270. For example, the search engine system 270 can identify search results 202, 203, and 204 using the phrase "atlanta extreme bungee jump" from the query 261, and using the candidate optional terms "bungee" and "extreme" of the phrase "atlanta extreme bungee jump."

As used by this specification, the optionalization rule notation "A (optional)" indicates that, according to a particular optionalization rule, the term "A" is designated as optional. Using this rule, a query reviser of the search engine system 270 may generate revised queries by designating "A" as optional or by performing other query revision techniques.

Continuing with the above example, the candidate optional terms "bungee" and "extreme" may be identified using two corresponding optionalization rules, specifically the rules "optionalize 'bungee' in the context of 'jump'" and "optionalize 'extreme' in the context of 'bungee jump'". Search results retrieved by the search engine system 270 can be identified by the search engine system 270 if they include the original query "atlanta extreme bungee jump," or if they include any of the revised search queries, for example, "atlanta extreme bungee (optional) jump" or "atlanta extreme (optional) bungee jump." For example, search result 202 does not include a candidate optional term "bungee." Similarly, search result 203 does not include candidate optional term "extreme." Search result 204 includes both candidate optional terms "extreme" and "bungee."

User interaction with the search results 266 can be measured in order to gain insights that the optionalization system 280 may use to evaluate particular optionalization rules. For example, a user selection 266 of a particular search result on search results page 256 can be received by the search engine system 270 and provided as a selection message 267 to the optionalization system 280. The optionalization system 280 may in turn evaluate particular optionalization rules that were used to identify the candidate optional terms associated with the particular search result, or to evaluate optionalization rules that were used to identify the candidate optional terms associated with search results that were not selected.

A particular optionalization rule may be used to identify a candidate optional term that is included in a particular revised query. If the search engine system 270 identifies a user-selected search result based on executing the particular revised query, the optionalization system 280 may, through click evaluation, infer that particular candidate optional term (and, by extension, the particular optionalization rule) drove the user's decision to select the user-selected search result.

On the other hand, if the search engine system 270 identifies a particular search result based on executing the particular revised query, and if the user does not select the particular search result, the optionalization system 280 may, through skip evaluation, infer that the particular candidate optional term (and, by extension, the particular optionalization rule) drove the user's decision to skip the particular search result. This example is particularly relevant when the user-selected result is lower ranking than, i.e., is displayed on a search result page below, the particular search result.

For example, the query 261, which includes the phrase "atlanta extreme bungee jump," produces search results 202, 203, and 204. If users generally tend to select search results that include the phrase "atlanta bungee jump" (e.g. search result 203), the optionalization system 280 can determine that using the phrase "atlanta extreme (optional) bungee jump" in revised queries does improve the quality of the search results. By extension, the optionalization system 280 can, through click evaluation, then infer that the optionalization rule "optionalize 'extreme' in the context of 'bungee jump'" is a helpful optionalization rule. This insight 290 may suggest that the "optionalize 'extreme' in the context of 'bungee jump'" optionalization rule should have an expanded role, or should be promoted or added to the optionalization system 280, in a general context or in particular contexts.

Conversely, if users tend to skip over search results that include the phrase "atlanta extreme bungee (optional) jump" (e.g. search result 202), the optionalization system 280 can determine that using the phrase "atlanta extreme bungee (optional) jump" in revised queries did not improve the quality of the search results. By extension, the optionalization system 280 can then infer, though skip evaluation, that the optionalization rule "optionalize 'bungee' in the context of 'jump'" is not a helpful optionalization rule. The insight 290 gained from this situation may suggest that the "optionalize 'bungee' in the context of 'jump'" optionalization rule may need to be limited, demoted or removed from the optionalization system 280, in a general context or in particular contexts.

To evaluate optionalization rules based on user interaction with provided search results, various metrics can be computed and combined into score for each optionalization rule. A separate score can be computed for each optionalization rule, in a general context or in particular contexts.

One metric that can be used to evaluate optionalization rules is a click count. In some implementations, a "click" occurs when a user selects a search result whose referenced document does not include a candidate optional term. In other implementations, a "click" occurs when the search result itself, and not the referenced document, does not include the candidate optional term. Although the selection of a search result is referred to by this specification as a "click," the selection can also be a voice-based selection, or a selection by a user's finger on a presence-sensitive input mechanism, e.g., a touch-screen device, or any other appropriate selection mechanism.

Another metric that can be used to evaluate optionalization rules is a skip count. A skip occurs when a user skips over a particular search result that was identified for a revised search query when the referenced document of the skipped search result does not include a candidate optional term. Skipping over the particular search result occurs when the user selects another search result that is ranked lower than, or displayed beneath, the particular result on a search results page. In other implementations, a "skip" occurs when the search result itself, and not the referenced document, satisfies these criteria.

Some types of clicks and skips are particularly informative for use in evaluating optionalization rules. These situations will be referred to in this specification as "crucial clicks" and "crucial skips." A crucial click or crucial skip situation occurs when a search result that is clicked or skipped is more directly associated with a single, particular optionalization.

The optionalization system 280 can aggregate counts of clicks, skips, crucial clicks, and crucial skips into a score that may be used to evaluate a particular optionalization rule. In some implementations, the optionalization system 280 can remove an optionalization rule whose corresponding score is below a threshold.

For example, the optionalization system 280 can assign a respective weight (e.g. 0, 3, 5, 10) to a crucial click count, a crucial skip count, a click count, and a skip count. The optionalization system 280 can then compute a weighted ratio using a combination of counts recorded for a particular optionalization rule as shown below in Equation (2), using example weights A and B:

$$\text{score} = \frac{(\text{crucial\_click\_count}*A) + (\text{click\_count}*B)}{\begin{bmatrix} (\text{crucial\_click\_count}*A) + (\text{click\_count}*B) + \\ (\text{crucial\_skip\_count}*A) + (\text{skip\_count}*B) \end{bmatrix}}. \quad (2)$$

If the score is below a threshold (e.g. 0.6, 0.75, 0.9, 0.99), the optionalization system 280 can remove or demote a particular optionalization rule. After removing the optionalization rule from the system, revised queries will generated by the search engine system 270 will not include candidate optional terms identified with the particular optionalization rule.

Figure 3A:
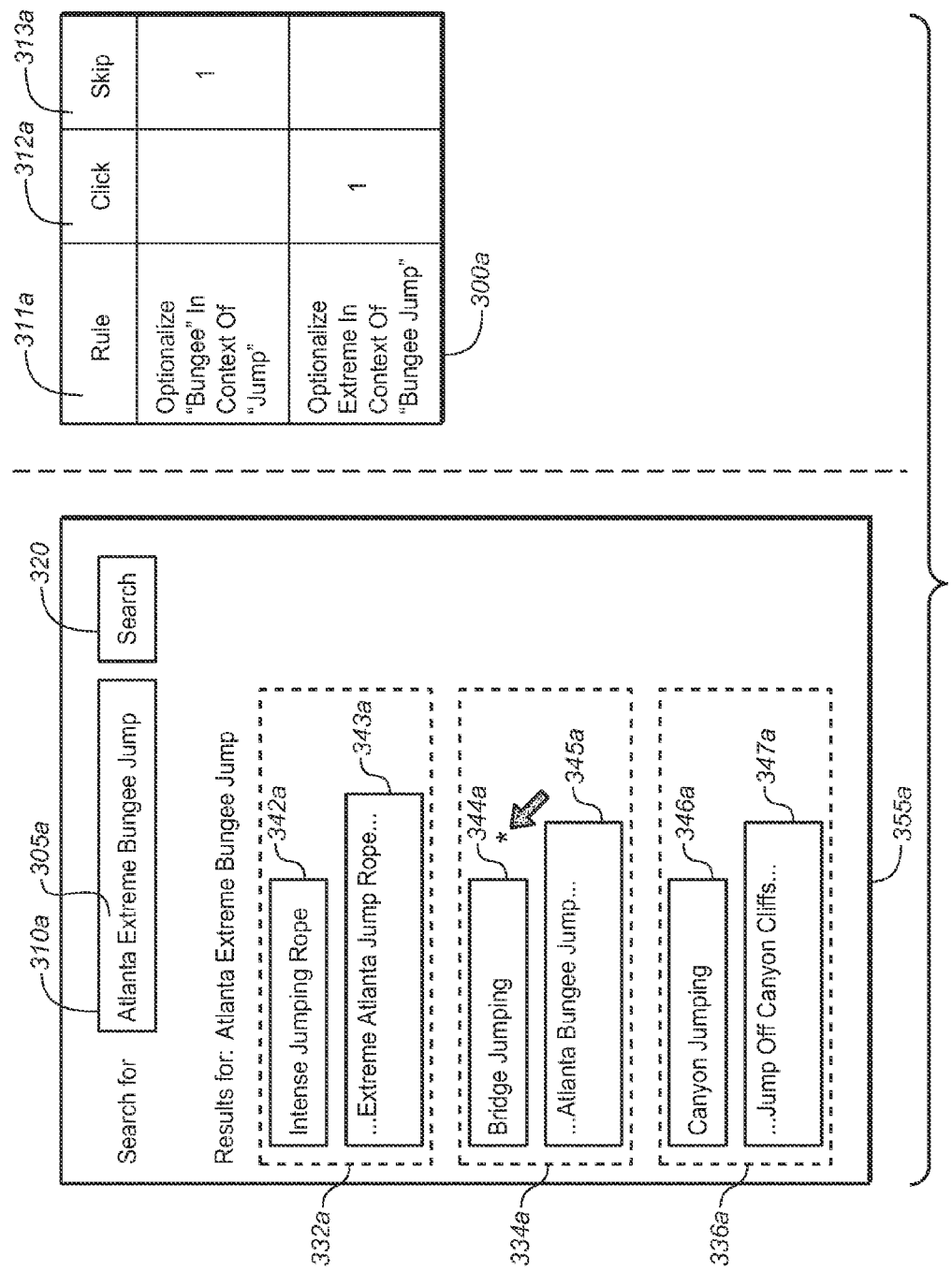
FIGS. 3A and 3B illustrate example search results pages and tables that show the example result of evaluating optionalization rules using click and skip evaluation.

FIG. 3A illustrates an example search results page 355a and a table 300b that show the example result of evaluating optionalization rules using click and skip evaluation. The example search results page 355a presents a ranked list of search results in response to search query 305a ("atlanta extreme bungee jump") entered into a search box 310a. The search results page can include control element 320 (e.g. a button) for initiating a search. Each search result 332a, 334a, and 336a includes a title (e.g. "Intense Jumping Rope" 342a) and a snippet (e.g. " . . . extreme atlanta jump rope . . . " 343a).

A user's selection of a particular search result can be evaluated using click or skip evaluation, resulting in a click or skip being counted for particular reordering rules associated with the particular search result. The search results page 355a can be provided by a search system, for example search system 130 as shown in FIG. 1. In addition, a search system (for example, search system 130 can receive user selections of search results on search results page 355a and evaluate optionalization rules based on the user selections.

In the example illustrated, for the four term search query "atlanta extreme bungee jump," the optionalization rules "optionalize 'bungee' in context of 'jump'" and "optionalize 'extreme' in context of 'bungee jump'" were used to generated a revised search query (not shown). The table 300a shows reordering rules 311a that have been used to retrieve search results 332a, 334a, and 336a. The resulting click count 312a and skip count 313a are also illustrated in table 300a. In the example shown in FIG. 3A, only the optionalization rules "optionalize 'bungee' in context of 'jump'" and "optionalize 'extreme' in context of 'bungee jump'" are illustrated, although optionalization rules other than those shown in table 300a may also have been used to retrieve 332a, 334a, and 336a.

In this example, search result 334a has been selected by a user. For the particular optionalization rule "optionalize 'extreme' in context of 'bungee jump'" the selected search result 334a does not contain the query term "extreme" and the search query 305a "atlanta extreme bungee jump" contains "extreme" in the context of "bungee jump." Therefore, the selection of the search result 334a is counted as a click for the optionalization rule "optionalize 'extreme' in context of 'bungee jump'" and recorded, illustrated under click count 312a in table 300a.

In addition, search result 332a has not been selected by a user. For the particular optionalization rule "optionalize 'bungee' in the context of 'jump,'" search result 332a does not contain the query term "bungee" and the search query 305a "atlanta extreme bungee jump" contains "bungee" in the context of "jump." In the search results page 355a, the search result 332a was ranked above the search result 334a on the search results page 355a. Therefore, because the user selected the search result 334a and skipped the search result 332a, the optionalization rule "optionalize 'bungee' in the context of 'jump'" is incremented as illustrated under skip count 313a in table 300a.

Figure 3B:
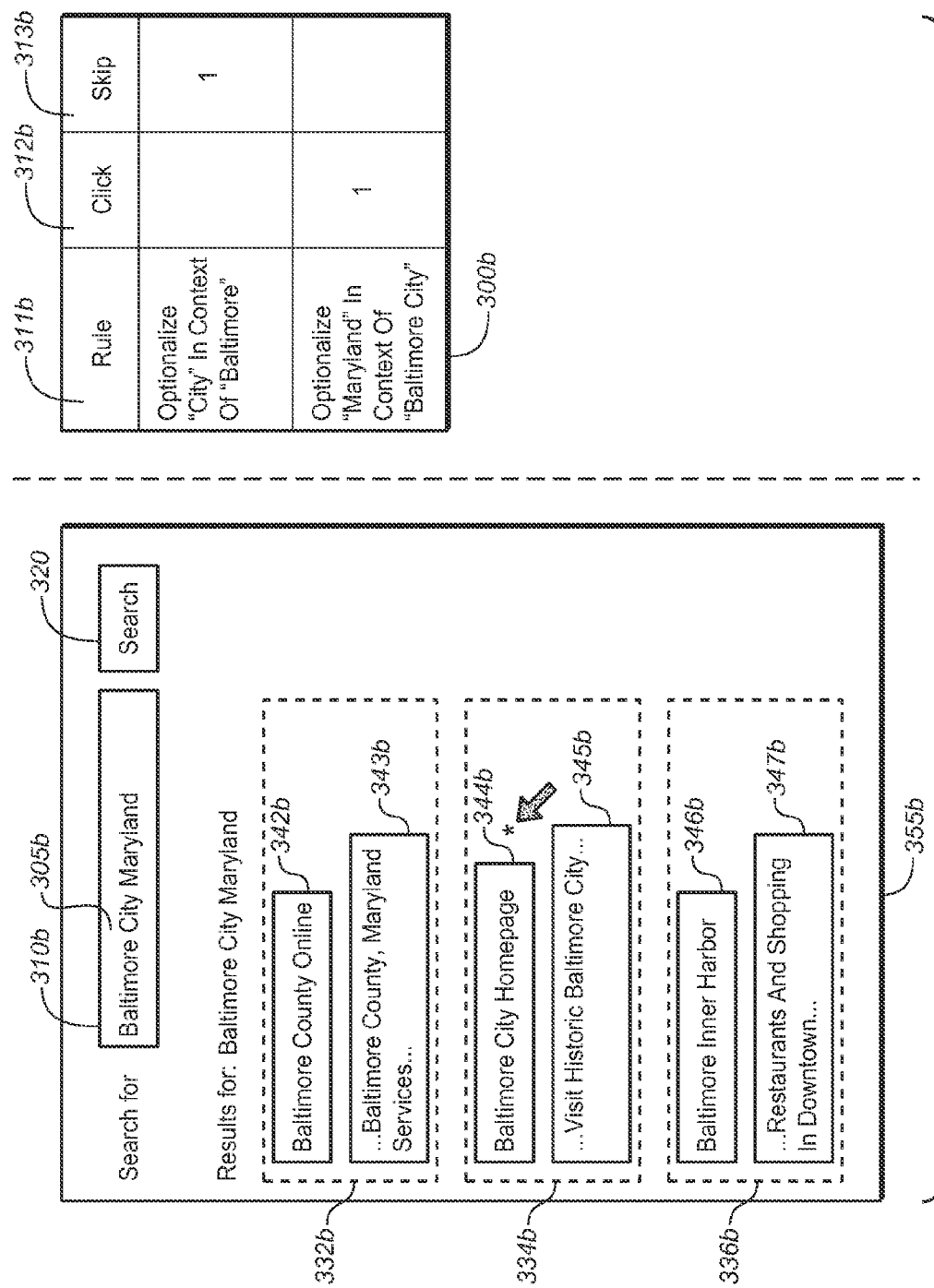

FIG. 3B illustrates an example search results page 355b and a table 300b that show the example result of evaluating optionalization rules using click and skip evaluation. The example search results page 355b is similar to the search results page as shown in FIG. 3A. However, in this example, optionalization rules "optionalize 'city' in the context of baltimore" and "optionalize Maryland' in context of baltimore city" are applied to the search query 305b "baltimore city maryland."

In this example, search result 334b has been selected by a user. For the particular optionalization rule "optionalize Maryland' in context of baltimore city," the selected search result 334b does not contain the query term "maryland" and the search query 305b "baltimore city maryland" contained "maryland" in the context of "Baltimore city." Therefore, the selection of the search result 334a is counted as a click for the optionalization rule "optionalize Maryland' in the context of baltimore city" and recorded, illustrated under click count 312b in table 300b.

In addition, search result 332a has not been selected by a user. For the particular optionalization rule "optionalize 'city' in the context of baltimore," search result 332b does not contain the query term "city" and the search query 305b "baltimore city maryland" contained "city" in the context of "baltimore." In the search results page 355b, the search result 332b was ranked above the search result 334b on the search results page 355b. Therefore, because the user selected the search result 334b and skipped the search result 332b, the optionalization rule "optionalize 'city' in the context of baltimore" is incremented as illustrated under the skip count 313b in table 300b.

An optionalization system 280 can aggregate counts of clicks and skips into a single score to evaluate a particular optionalization rule. In some implementations, the optionalization system 280 can remove an optionalization rule whose corresponding score is below a threshold.

For example, the optionalization system 280 can assign a respective weight (e.g. 3 and 5) to a click count and a skip count. In some implementations, the weights are empirically determined. The optionalization system can then compute a weighted ratio using a combination of counts recorded for a particular optionalization rule as shown below in Equation (3), using example weights A and B:

$$\frac{A(\text{click count})}{A(\text{click count}) + B(\text{skip count})} \quad (3)$$

If the score is below a threshold (e.g. 0.6, 0.75, 0.9, 0.99), the optionalization system can remove or demote a particular optionalization rule. After removing the optionalization rule from the system, revised queries generated by the search engine system will not include optionalized terms identified with the particular optionalization rule.

Figure 4:
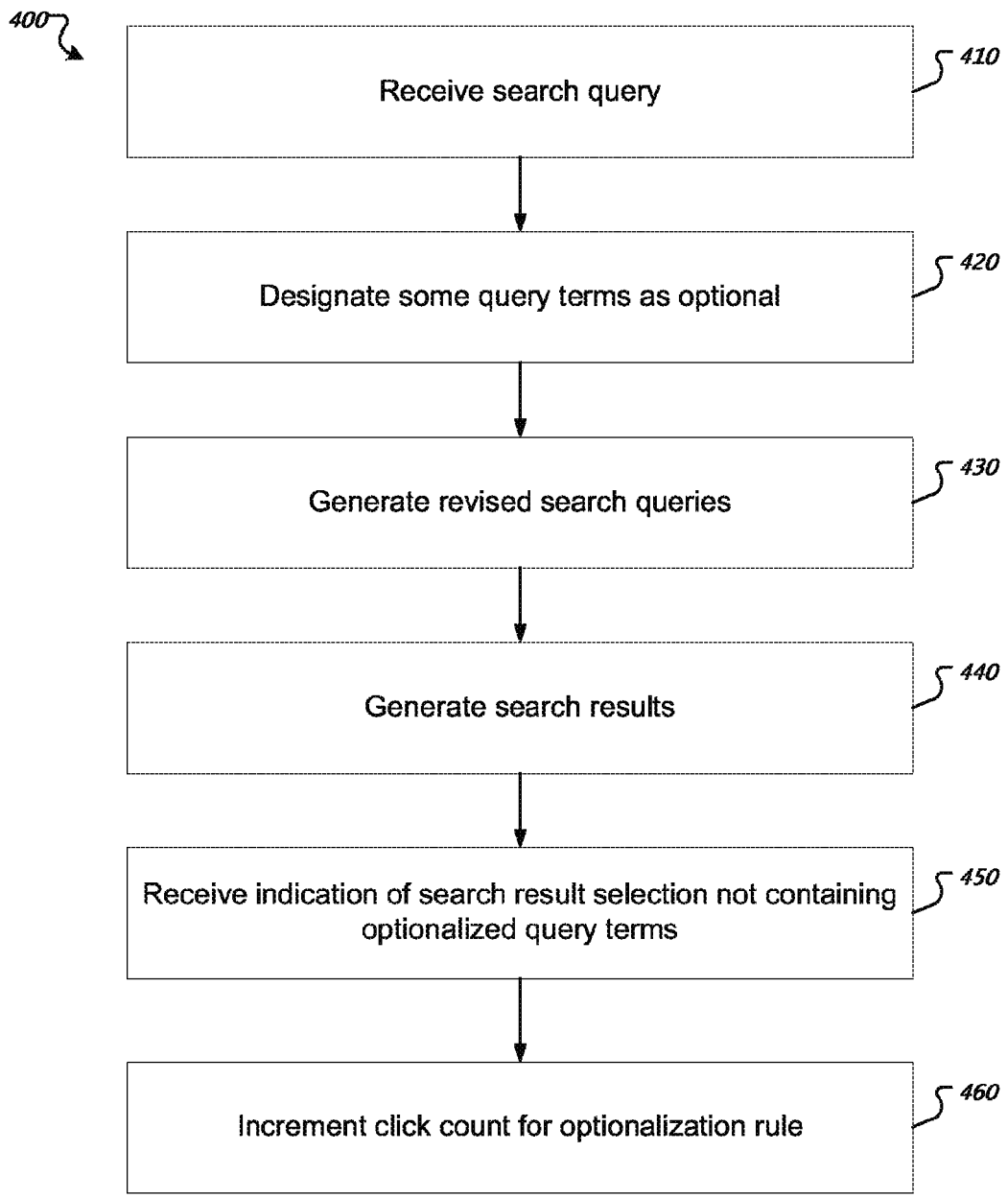
FIGS. 4 and 5 are flow charts of example processes for evaluating optionalization rules using click and skip evaluation.

FIG. 4 is a flow chart of an example process 400 for evaluating optionalization rules using click and skip evaluation. In general, the process 400 analyzes user interaction with a provided set of search results that were identified using revised search queries generated using a particular optionalization rule. The process 400 will be described as being performed by a computer system comprising one or more computers, for example, the search system 130 as shown in FIG. 1.

The system receives and initial search query including a query term (410). Search queries can contain one or more terms. For each search query, the system can identify optionalization rules to be used for retrieving search results.

The system generates one or more candidate optional terms using a corresponding one or more optionalization rules (420). As described above, an optionalization rule can either be general, in which the rule applies regardless of other terms in the search query, or the optionalization rule can be context specific, in which the rule only applies when other particular words are present. For example, the optionalization rule "optionalize 'the'" can be modified to apply only when "the" is followed by a noun.

The system generates one or more revised search queries that include the one or more candidate optional terms (430). In some implementations, the system generates revised queries by adding the candidate optional terms onto the original search query. In some implementations, the system replaces one or more terms of the original search query with the candidate optional terms.

The system generates search results using the initial search query and the one or more revised search queries that were generated using the one or more optionalization rules (440). By using a revised search query containing candidate optional terms, the system can retrieve search results that would otherwise not have been identified. The system can use the retrieved search results to generate a search results page that is forwarded for display by a client device.

The system receives an indication that the user has selected a particular search result (450). The system determines that the particular search result does not include the candidate optional terms generated by the one or more optionalization rules. In some implementations, instead of analyzing only the provided search result, the system analyzes the entire indexed document for the presence or absence of the candidate optional terms and the original query terms. The system can identify that the selected search result is a click scenario and increment the appropriate click count for the optionalization rule.

The system increments a click count for the optionalization rule that corresponds to the particular search result (460). The system can combine one or multiple click and skip counts into a single score for the optionalization rule. Each count can have an associated weight. For example, the system can weight the click count five times more significant than the skip count.

In some implementations, the system computes a score based on a ratio of click counts to skip counts. The system can then use the score to adjust a confidence score for the particular optionalization rule. The system can also remove a optionalization rule whose score did not exceed a threshold. In other words, subsequently generated revised queries will not include terms designated as optional according to the removed optionalization rule.

In some implementations, the system can compute click counts and skip counts for a particular optionalization rule offline by processing data stored in a query log. Query logs store anonymized data regarding provided search results for a certain period of time (e.g. a week). Query log data can include, for example, an initial search query, candidate optional terms in the initial search query, one or more revised search queries generated using the optionalization rule used to retrieve search results, the search results retrieved by the initial search query and one or more revised search queries generated using the one or more optionalization rule, and one or more search results that were selected by a user.

By using query log data, the system can compute confidence scores using click counts and skip counts offline instead of waiting for real-time interaction with provided search results. The system can process query log data periodically to compute scores for optionalization rules and remove or adjust confidence scores of optionalization rules as needed.

Figure 5:
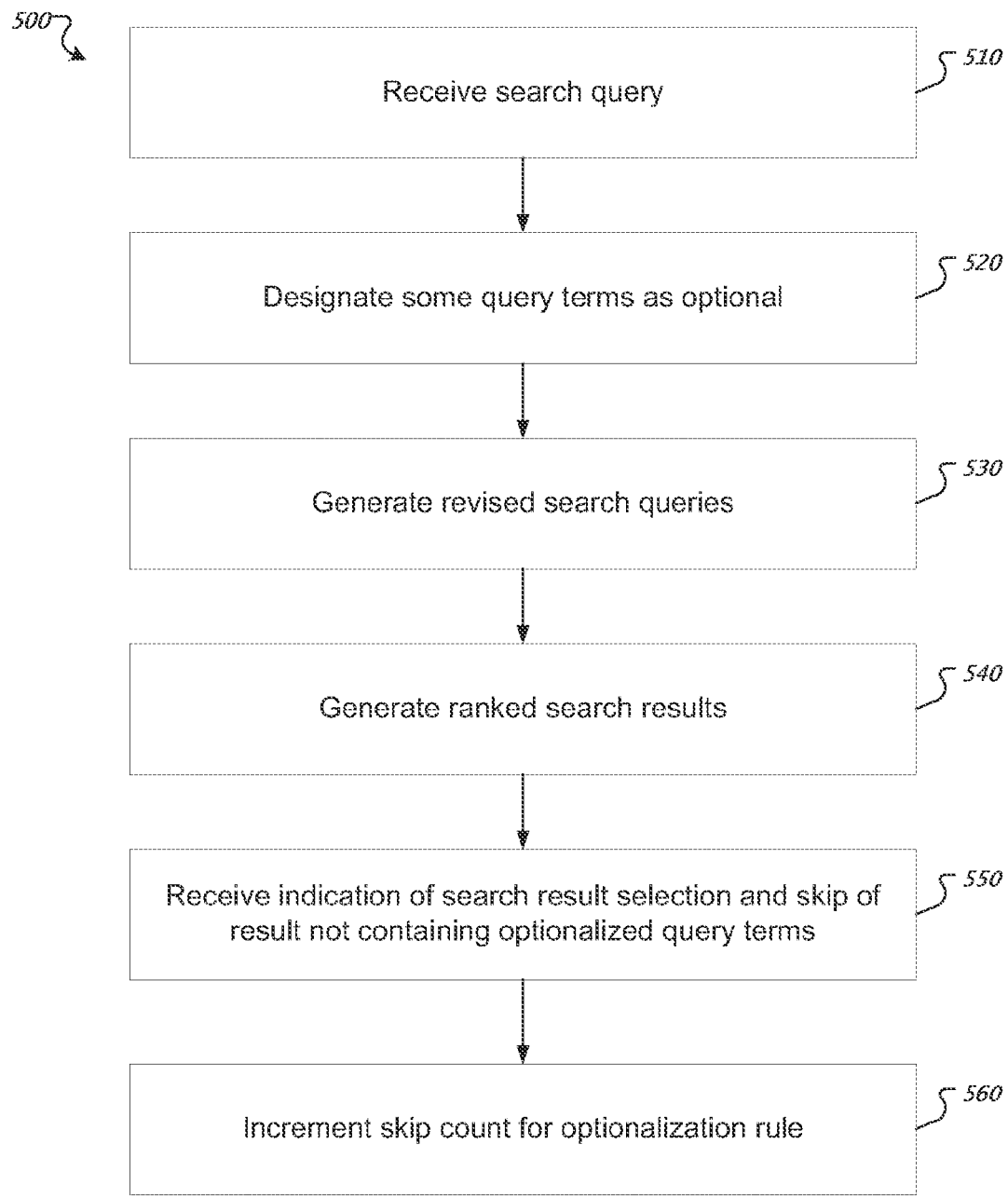

FIG. 5 is a flow chart of an example process 500 for evaluating optionalization rules using clicks and skips. In general, the process 500 analyzes user interaction with a provided set of search results that were identified using revised search queries generated using a particular optionalization rule. The process 500 will be described as being performed by a computer system comprising one or more computers, for example, the search system 130 as shown in FIG. 1.

The system receives an initial search query including a query term (510). Search queries can contain one or more query terms. For each query term, the system can identify optionalization rules for each query term to be used for retrieving search results.

The system generates one or more candidate optional terms using a corresponding one or more optionalization rules (520). Optionalization rules identify query terms which can be designated as optional. As described above, an optionalization rule can either be general, in which the rule applies regardless of other terms in the search query, or the optionalization rule can be context specific, in which the rule only applies when other particular words are present. For example, the optionalization rule "optionalize 'how'" can be modified to apply only when "how" is followed by a verb.

The system generates one or more revised search queries using the one or more optionalization rules (530). In some implementations, the system generates revised search queries by adding the candidate optional terms onto the original search query. In some implementations, the system replaces one or more query terms of the original search query with the candidate optional terms.

The system generates ranked search results using the initial search query and the one or more revised search queries generated using the one or more optionalization rules (540). By using a revised search query generated using the one or more optionalization rules, the system can retrieve search results that would otherwise not have been identified. The system can use the retrieved search results to generate a search results page that is forwarded for display by a client device. The system ranks the search results and lists them in descending order, the highest ranked search result being at the top of the search results page.

The system receives an indication that the user has selected a particular search result (550). The system determines that a search result that is ranked above the particular search result does not include a candidate optional term. In some implementations, instead of analyzing only the provided search result, the system analyzes the entire indexed document for the presence or absence of the candidate optional terms and the original query terms. The system can identify that the selected search result is a skip scenario and increment the appropriate skip count for the optionalization rule.

The system increments a skip count for the optionalization rule that corresponds to the particular search result (560). The system can combine one or multiple click and skip counts into a single score for the optionalization rule. Each count can have an associated weight. For example, the system can weight the click count five times more significant than the skip count.

In some implementations, the system computes a score based on a ratio of click counts to skip counts. The system can then use the score to adjust a confidence score for the particular optionalization rule. The system can also remove an optionalization rule whose score did not exceed a threshold. In other words, subsequently revised queries will not be generated using the removed optionalization rule.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
accessing data that identifies one or more query term optionalization rules that are specific to a particular query term, the one or more query term optionalization rules indicating whether the particular query term should be made optional in revisions of search queries that include the particular query term;
accessing query log data that identifies, for an initial search query that includes the particular query term:
one or more revised search queries that a search engine system generated in response to the initial search query using the one or more query term optionalization rules that are specific to the particular query term, wherein the particular query term is optional in the one or more revised search queries,
search results that were identified using the initial search query,
search results that were identified using the one or more revised search queries, and
a particular search result selected by a user from among a set of search results that includes (i) one or more of the search results that were identified using the initial search query and (ii) one or more of the search results that were identified using the one or more revised search queries;
determining, using the query log data, that the particular search result is one of the search results that were identified using the one or more revised search queries;
in response to determining that the particular search result is one of the search results that were identified using the one or more revised search queries, adjusting a click count for the one or more query term optionalization rules that are specific to the particular query term; and
after adjusting the click count for the one or more query term optionalization rules that are specific to the particular query term, determining, based at least on the click count for the one or more query term optionalization rules that are specific to the particular query term, whether to revise a subsequently-received search query that includes the particular query term using the one or more query term optionalization rules that are specific to the particular query term.

2. The method of claim 1, comprising:
ranking the search results included in the set of search results that includes (i) the one or more of the search results that were identified using the initial search query and (ii) the one or more of the search results that were identified using the one or more revised search queries;
determining, using the query log data, that a search result that is ranked above the particular search result is one of the search results that were identified using the one or more revised search queries; and
in response to determining that the search result that is ranked above the particular search result is one of the search results that were identified using the one or more revised search queries, adjusting a skip count for the one or more query term optionalization rules that are specific to the particular query term.

3. The method of claim 2, comprising associating a first weight with the click count and a second weight with the skip count.

4. The method of claim 3, wherein the score assigned to the one or more query term optionalization rules that are specific to the particular query term satisfies:

$$\frac{W1(\text{click count})}{W1(\text{click count}) + W2(\text{skip count})}$$

wherein W1 represents the weight associated with the click count and W2 represents the weight associated with the skip count.

5. The method of claim 2, comprising assigning a score to the one or more query term optionalization rules that are specific to the particular query term based at least on the click count and the skip count.

6. The method of claim 5, wherein the score assigned to the one or more query term optionalization rules that are specific to the particular query term is based on a ratio of (i) the click count to (ii) the click count and the skip count.

7. The method of claim 5, comprising:
determining that the score assigned to the one or more query term optionalization rules that are specific to the particular query term does not satisfy a threshold; and
removing the one or more query term optionalization rules that are specific to the particular query term from a set of query term optionalization rules that includes other query term optionalization rules that are specific to other query terms, the other query term optionalization rules indicating whether the other query terms should be made optional in revisions of search queries that include the other query terms, based on determining that the score assigned to the one or more query term optionalization rules that are specific to the particular query term does not satisfy the threshold.

8. The method of claim 1, wherein the one or more revised search queries were generated by the search engine system using one or more query term optionalization rules that are specific to the particular query term and are associated with a particular context,
wherein the one or more query term optionalization rules that are specific to the particular query term and are associated with the particular context indicate whether the particular query term should be made optional in revisions of search queries that include the particular query term and the particular other query term, wherein the initial search query includes the particular other query term, and wherein adjusting the click count for the one or more query term optionalization rules that are specific to the particular query term comprises adjusting a click count for the one or more query term optionalization rules that are specific to the particular query term and are associated with the particular context.

9. The method of claim 1, wherein adjusting the click count for the one or more query term optionalization rules that are specific to the particular query term comprises:

determining, using the query log data, that the particular search result does not include the particular query term; and adjusting the click count for the one or more query term optionalization rules that are specific to the particular query term in response to (i) determining that the particular search result is one of the search results that were identified using the one or more revised search queries, and (ii) determining that the particular search result does not include the particular query term included in the initial search query.

10. A non-transitory computer-readable medium storing software comprising instructions executable by one or more computers which, upon such execution, cause the one or more computers to perform operations comprising:

accessing data that identifies one or more query term optionalization rules that are specific to a particular query term, the one or more query term optionalization rules indicating whether the particular query term should be made optional in revisions of search queries that include the particular query term;

accessing query log data that identifies, for an initial search query that includes the particular query term:

one or more revised search queries that a search engine system generated in response to the initial search query using the one or more query term optionalization rules that are specific to the particular query term, wherein the particular query term is optional in the one or more revised search queries, search results that were identified using the initial search query, search results that were identified using the one or more revised search queries, and a particular search result selected by a user from among a set of search results that includes (i) one or more of the search results that were identified using the initial search query and (ii) one or more of the search results that were identified using the one or more revised search queries;

determining, using the query log data, that the particular search result is one of the search results that were identified using the one or more revised search queries;

in response to determining that the particular search result is one of the search results that were identified using the one or more revised search queries, adjusting a click count for the one or more query term optionalization rules that are specific to the particular query term; and after adjusting the click count for the one or more query term optionalization rules that are specific to the particular query team, determining, based at least on the click count for the one or more query term optionalization rules that are specific to the particular query term, whether to revise a subsequently-received search query that includes the particular query term using the one or more query term optionalization rules that are specific to the particular query term.

11. The medium of claim 10, wherein the operations comprise:

ranking the search results included in the set of search results that includes (i) the one or more of the search results that were identified using the initial search query and (ii) the one or more of the search results that were identified using the one or more revised search queries;

determining, using the query log data, that a search result that is ranked above the particular search result is one of the search results that were identified using the one or more revised search queries; and in response to determining that the search result that is ranked above the particular search result is one of the search results that were identified using the one or more revised search queries, adjusting a skip count for the one or more query term optionalization rules that are specific to the particular query term.

12. The medium of claim 11, wherein the operations comprise assigning a score to the one or more query term optionalization rules that are specific to the particular query term based at least on the click count and the skip count.

13. The medium of claim 12, wherein the score assigned to the one or more query term optionalization rules that are specific to the particular query term is based on a ratio of (i) the click count to (ii) the click count and the skip count.

14. The medium of claim 12, wherein the operations comprise:

determining that the score assigned to the one or more query term optionalization rules that are specific to the particular query term does not satisfy a threshold; and removing the one or more query term optionalization rules that are specific to the particular query term from a set of query term optionalization rules that includes other query term optionalization rules that are specific to other query terms, the other query term optionalization rules indicating whether the other query terms should be made optional in revisions of search queries that include the other query terms, based on determining that the score assigned to the one or more query term optionalization rules that are specific to the particular query term does not satisfy the threshold.

15. The medium of claim 11, wherein the operations comprise associating a first weight with the click count and a second weight with the skip count.

16. The medium of claim 15, wherein the score assigned to the one or more query term optionalization rules that are specific to the particular query term satisfies:

$$\frac{W1(\text{click count})}{W1(\text{click count}) + W2(\text{skip count})}$$

wherein W1 represents the weight associated with the click count and W2 represents the weight associated with the skip count.

17. The medium of claim 10, wherein the one or more revised search queries were generated by the search engine system using one or more query term optionalization rules that are specific to the particular query term and are associated with a particular context, wherein the one or more query term optionalization rules that are specific to the particular query term and are associated with the particular context indicate whether the particular query term should be made optional in revisions of search queries that include the particular query term and the particular other query term, wherein the initial search query includes the particular other query term, and wherein adjusting the click count for the one or more query term optionalization rules that are specific to the particular query term comprises adjusting a click count for the one or more query term optionalization rules that are specific to the particular query term and are associated with the particular context.

18. A system comprising:

one or more computers and one or more storage devices storing instructions that are operable, when executed by the one or more computers, to cause the one or more computers to perform operations comprising:

accessing data that identifies one or more query term optionalization rules that are specific to a particular query term, the one or more query term optionalization rules indicating whether the particular query term should be made optional in revisions of search queries that include the particular query term;

accessing query log data that identifies, for an initial search query that includes the particular query term:
one or more revised search queries that a search engine system generated in response to the initial search query using the one or more query term optionalization rules that are specific to the particular query term, wherein the particular query term is optional in the one or more revised search queries,
search results that were identified using the initial search query,
search results that were identified using the one or more revised search queries, and
a particular search result selected by a user from among a set of search results that includes (i) one or more of the search results that were identified using the initial search query and (ii) one or more of the search results that were identified using the one or more revised search queries;

determining, using the query log data, that the particular search result is one of the search results that were identified using the one or more revised search queries;

in response to determining that the particular search result is one of the search results that were identified using the one or more revised search queries, adjusting a click count for the one or more query term optionalization rules that are specific to the particular query term; and after adjusting the click count for the one or more query term optionalization rules that are specific to the particular query term, determining, based at least on the click count for the one or more query term optionalization rules that are specific to the particular query term, whether to revise a subsequently-received search query that includes the particular query term using the one or more query term optionalization rules that are specific to the particular query term.

19. The system of claim 18, wherein the operations comprise:

ranking the search results included in the set of search results that includes (i) the one or more of the search results that were identified using the initial search query and (ii) the one or more of the search results that were identified using the one or more revised search queries;

determining, using the query log data, that a search result that is ranked above the particular search result is one of the search results that were identified using the one or more revised search queries; and in response to determining that the search result that is ranked above the particular search result is one of the search results that were identified using the one or more revised search queries, adjusting a skip count for the one or more query term optionalization rules that are specific to the particular query term.

20. The system of claim 19, wherein the operations comprise assigning a score to the one or more query term optionalization rules that are specific to the particular query term based at least on the click count and the skip count.

21. The system of claim 20, wherein the operations comprise:

determining that the score assigned to the one or more query term optionalization rules that are specific to the particular query term does not satisfy a threshold; and removing the one or more query term optionalization rules that are specific to the particular query term from a set of query term optionalization rules that includes other query term optionalization rules that are specific to other query terms, the other query term optionalization rules indicating whether the other query terms should be made optional in revisions of search queries that include the other query terms, based on determining that the score assigned to the one or more query term optionalization rules that are specific to the particular query term does not satisfy the threshold.

22. The system of claim 19, wherein the operations comprise associating a first weight with the click count and a second weight with the skip count.

23. The system of claim 22, wherein the score assigned to the one or more query term optionalization rules that are specific to the particular query term satisfies:

$$\frac{W1(\text{click count})}{W1(\text{click count}) + W2(\text{skip count})}$$

wherein W1 represents the weight associated with the click count and W2 represents the weight associated with the skip count.

24. The system of claim 18, wherein the one or more revised search queries were generated by the search engine system using one or more query term optionalization rules that are specific to the particular query term and are associated with a particular context, wherein the one or more query term optionalization rules that are specific to the particular query term and are associated with the particular context indicate whether the particular query term should be made optional in revisions of search queries that include the particular query term and the particular other query term, wherein the initial search query includes the particular other query term, and wherein adjusting the click count for the one or more query term optionalization rules that are specific to the particular query term comprises adjusting a click count for the one or more query term optionalization rules that are specific to the particular query term and are associated with the particular context.

25. A computer-implemented method comprising:

accessing data that identifies one or more query term optionalization rules that are specific to a particular query term, the one or more query term optionalization rules indicating whether the particular query term should be made optional in revisions of search queries that include the particular query term;
accessing query log data that identifies, for an initial search query that includes the particular query term:
  one or more revised search queries that a search engine system generated in response to the initial search query using the one or more query term optionalization rules that are specific to the particular query term, wherein the particular query term is optional in the one or more revised search queries
  search results that were identified using the initial search query,
  search results that were identified using the one or more revised search queries,
  a ranking of a set of search results that includes (i) one or more of the search results that were identified using the initial search query and (ii) one or more of the search results that were identified using the one or more revised search queries, and
  a particular search result selected by a user from among the set of search results that includes (i) the one or more of the search results that were identified using the initial search query and (ii) the one or more of the search results that were identified using the one or more revised search queries;
determining, using the query log data, that a search result that is ranked above the particular search result is one of the search results that were identified using the one or more revised search queries;
in response to determining that the search result that is ranked above the particular search result is one of the search results that were identified using the one or more revised search queries, adjusting a skip count for the one or more query term optionalization rules that are specific to the particular query term; and
after adjusting the skip count for the one or more query term optionalization rules that are specific to the particular query term, determining, based at least on the skip count for the one or more query term optionalization rules that are specific to the particular query term, whether to revise a subsequently-received search query that includes the particular query term using the one or more query term optionalization rules that are specific to the particular query term.

26. The method of claim 25, comprising:
determining, using the query log data, that the particular search result is one of the search results that were identified using the one or more revised search queries; and
in response to determining that the particular search result is one of the search results that were identified using the one or more revised search queries, adjusting a click count for the one or more query term optionalization rules that are specific to the particular query term.

27. The method of claim 26, comprising assigning a score to the one or more query term optionalization rules that are specific to the particular query term based at least on the click count and the skip count.

28. The method of claim 27, wherein the score assigned to the one or more query term optionalization rules that are specific to the particular query term is based on a ratio of (i) the click count to (ii) the click count and the skip count.

29. The method of claim 27, comprising:
determining that the score assigned to the one or more query term optionalization rules that are specific to the particular query term does not satisfy a threshold; and
removing the one or more query term optionalization rules that are specific to the particular query term from a set of query term optionalization rules that includes other query term optionalization rules that are specific to other query terms, the other query term optionalization rules indicating whether the other query terms should be made optional in revisions of search queries that include the other query terms, based on determining that the score assigned to the one or more query term optionalization rules that are specific to the particular query term does not satisfy the threshold.

30. The method of claim 27, wherein the score assigned to the one or more query term optionalization rules that are specific to the particular query term satisfies:

$$\frac{W1(\text{click count})}{W1(\text{click count}) + W2(\text{skip count})}$$

wherein W1 represents the weight associated with the click count and W2 represents the weight associated with the skip count.

31. The method of claim 26, comprising associating a first weight with the click count and a second weight with the skip count.

32. The method of claim 25, wherein the one or more revised search queries were generated by the search engine system using one or more query term optionalization rules that are specific to the particular query term and are associated with a particular context,
  wherein the one or more query term optionalization rules that are specific to the particular query term and are associated with the particular context indicate whether the particular query term should be made optional in revisions of search queries that include the particular query term and the particular other query term,
  wherein the initial search query includes the particular other query term, and
  wherein adjusting the click count for the one or more query term optionalization rules that are specific to the particular query term comprises adjusting a click count for the one or more query term optionalization rules that are specific to the particular query term and are associated with the particular context.

* * * * *